United States Patent [19]

Wales et al.

[11] Patent Number: 4,852,604

[45] Date of Patent: Aug. 1, 1989

[54] INK MONITOR SYSTEM

[75] Inventors: R. Langdon Wales, Lincoln; H. W. Crowley, Newton, both of Mass.

[73] Assignee: Automation, Inc., Needham, Mass.

[21] Appl. No.: 104,241

[22] Filed: Oct. 5, 1987

Related U.S. Application Data

[62] Division of Ser. No. 792,745, Oct. 30, 1985, Pat. No. 4,796,782.

[51] Int. Cl.[4] ........................ F16K 31/02; F16K 31/12

[52] U.S. Cl. .................................... 137/392; 101/364; 137/624.18; 222/56; 417/12

[58] Field of Search .................... 137/386, 392, 624.11, 137/624.18; 101/350, 364; 222/56; 417/12

[56] References Cited

U.S. PATENT DOCUMENTS

| | | | |
|---|---|---|---|
| 1,690,888 | 11/1928 | Dawe | 101/364 |
| 2,612,180 | 9/1952 | Schwarzkopf | 137/392 |
| 2,813,538 | 11/1957 | Di Genova | 101/364 |
| 3,580,158 | 5/1971 | Scholle et al. | 137/392 |
| 3,667,500 | 6/1972 | Stone | 101/364 |
| 3,896,730 | 7/1975 | Garrett et al. | 101/364 |
| 4,612,949 | 9/1986 | Henson | 137/392 |
| 4,635,668 | 1/1987 | Netter | 137/392 |

FOREIGN PATENT DOCUMENTS

| | | | |
|---|---|---|---|
| 2410753 | 9/1975 | Fed. Rep. of Germany . | |
| 3128887 | 2/1983 | Fed. Rep. of Germany . | |
| 1300737 | 10/1962 | France . | |
| 2338142 | 8/1977 | France . | |
| 2355657 | 1/1978 | France . | |
| 0020453 | 2/1983 | Japan | 101/364 |
| 0159350 | 9/1984 | Japan | 101/364 |
| 289171 | 4/1928 | United Kingdom | 101/364 |
| 1514441 | 6/1978 | United Kingdom . | |

*Primary Examiner*—George L. Walton

*Attorney, Agent, or Firm*—Wolf, Greenfield & Sacks

[57] ABSTRACT

A system for monitoring ink flow from an ink storage tank to at least one ink fountain of a high-speed, web-fed printing press employing a scale for measuring the weight of the ink storage tank and comparing weight signals from the scale at successive times to determine the weight of ink consumed over the interval between readings. A pump is associated with the storage tank for pumping the ink to the fountain via coupling lines. An ink level sensor detects the level of ink in the fountain and provides an ink demand signal for operating a valve means in the ink coupling line to in turn cause ink flow to the fountain so as to provide replenishment of ink thereat. With the use of plural fountains, means are provided for prioritizing delivery to the fountains so that individual ink consumption on a per fountain basis can be determined. In this regard, the system also employs a volume sensor preferably in the form of a pump stroke position sensor for determining incremental weight delivery per stroke.

4 Claims, 5 Drawing Sheets

INK MONITOR SYSTEM

This application is a division of application Ser. No. 06/792,745, filed 10-30-85 now U.S. Pat. No. 4,796,782.

BACKGROUND OF THE INVENTION

The present invention relates in general to an ink monitor system and pertains, more particularly, to an improved system for monitoring the weight of ink consumed, particularly as it relates to a high-speed, web-fed printing operation.

Continuous high-speed web-fed printing presses produce printed product at a very high rate. They also consume materials, primarily ink and paper, at a very high rate. While the gross consumption of ink can be determined after the fact by examining the amount of ink purchased less that remaining in inventory or the number of cans, barrels, etc. consumed in the course of a week or a month, there is no effective way of measuring ink consumption and allocating that consumption accurately to the various points in the printing process at which ink is consumed.

To understand the problem, one can consider a typical ink-consuming machine, a web offset printing press. The press comprises a paper supply, usually in the form of a roll stand and automatic splicing device that provides paper to the press continuously from a sequence of paper supply rolls. A web tensioning device and a sequence of printing units, usually not less than four nor more than eight, print images of different colors on the web in succession. At the end of the printing units is equipment for causing the ink to set and for either rewinding the product or dividing the web into individual products through a combination of folding and cutting processes.

Each printing unit has two lithographic plate cylinders, each of which is coupled with a blanket cylinder for the purpose of transferring an inked image from the plate to the paper. The two blanket cylinders have surfaces of a resilient rubber-like characteristic and engage each other along a nip, through which the paper passes and, in so doing, have the inked images from both blanket cylinders transferred to its surface.

The plate cylinders carry plates having the image information on their surface in the form of differentiated wetting properties for oil and water. In rotating from one engagement with the blanket cylinder to the next, an element of the plate cylinder first moves under the dampening system which places a thin, uniform film of water on all parts of the plate cylinder that are susceptible to being wetted. It then passes under the ink system. A second series of rollers delivers a uniform, thin film of ink to those areas of the plate that have been sensitized to receive ink and reject water.

The source of ink is a tray disposed crosswise of the web, one side of which is formed by or supports a roller. The bottom of the tray has a thin plate or a blade, having an adjustable clearance with the roller, so that as the roller turns, it has deposited upon it a film of ink whose thickness is controllable by adjusting the blade clearance. The blade may be flexible, or formed of segments, to print differential control of ink film thickness across the web. The ink, so supplied to the roller, is delivered through a series of contacting rollers to the plate. The quantity of ink delivered to the plate may be varied by adjusting the ink film delivered to the fountain roller.

In the printing process, the fountain blade is adjusted so that the ideal amount of ink is delivered by the fountain to produce the correct color density in the printed image. In practice, however, the amount of ink delivered may vary from the ideal. And while a deficiency of ink is usually readily apparent, an appreciable excess can be delivered without greatly affecting the image quality. Thus, it is desirable to measure directly the quantity of ink being applied at each fountain.

In setting prices for printing work, it is necessary to estimate total quantities of paper, ink, labor, and press time to be consumed in completing the job. In the performance of the work, it is also desirable to measure the actual quantities used in order to compare with the estimate, to determine the profitability of the particular job and the accuracy of the estimating procedure. While means exist for the measuring of time, labor, and paper consumption, the measurement of ink consumption is a much less satisfactory procedure, especially when ink is supplied continuously to a multiplicity of jobs by pumping from large tanks. Ink is bought by the pound and has a variable density so volumetric flow meters offer a poor approximation to the ink used.

Accordingly, it is an object of the present invention to measure accurately the total quantity of ink delivered to each job, for each color used, and to indicate the rate of pounds of ink consumption at each consuming point associated with the press.

Existing systems for the measurement of ink consumption typically rely on metering devices in the ink lines supplying a whole press. When displacement-type meters are used, it is necessary to convert the volume of ink used to weight, using the density of the ink. However, ink densities vary widely, not only from color-to-color, brand-to-brand, and lot-to-lot within a brand, but also the ink drawn from a given container may vary in density, so that even if each ink container is sampled, the method is still inaccurate. A true mass rate flowmeter would overcome this, and attempts have been made to employ so-called mass sensing meters but without success. Even if a mass rate meter compatible with inks were to be developed, it would suffer from the drawback of all feed line metering systems; the inability to attribute the ink to the individual consuming points to know how much was used at each fountain. While this could theoretically be overcome by use of a mass rate flowmeter at the line feeding each individual fountain, the number of meters so required would be large, and the system uneconomic as a result.

Accordingly, it is a further object of the present invention to provide indication of the weight of ink consumed at each fountain of a web offset press having many such fountains and to provide the indication of weight, independent of density variations in the ink, and without requiring that sensors be installed at each fountain.

A further object of the present invention is to provide an ink monitor system for indicating the rate of ink consumption in weight of ink per thousand printed products at each ink consuming position in the press.

Still another object of the present invention is to provide an ink monitor system that provides a remote indication of the amount of ink in each tank in use for supplying ink to the press.

Another object of the present invention is to provide an ink monitoring system having alarms when the ink has reached a predetermined low level so that provision of a replacement tank can take place.

SUMMARY OF THE INVENTION

To accomplish the foregoing, other objects, features and advantages of the invention there is provided a system for monitoring an ink flow from an ink storage tank to at least one ink consumption point which is typically an ink fountain of a high-speed, web-fed printing press. The system typically includes at least one press with each press comprised of a number of press units and with there typically being a plurality of storage tanks, each containing a different color ink. In accordance with the invention, a scale means is provided for measuring the weight of the ink storage tank with the stored ink therein, and for providing a continuous signal representative of measured weight. There is a pump means associated with the storage tank for pumping the ink to the fountain including coupling lines to the fountain. Each pump may actually service one or more tanks and in accordance with the invention has associated therewith, a means for sensing a volume flow of ink delivered. An ink sensor means is provided for detecting the level of ink in the fountain and for providing an ink demand signal when the level of ink in the fountain falls below a predetermined level. Valve means are provided in ink coupling means for controlling ink flow to the fountain. Control means is responsive to this demand signal for operating the valve means to cause ink flow to the fountain. Thus, in accordance with the invention, it can be seen that rather than trying to provide some type of weight flow meter in the coupling lines, a scale means is provided for measuring the tank and ink therein. Means are then provided for comparing the weight signals from the scale at successive times to determine the weight of ink consumed over the interval between readings. This thus readily provides a weight indication of weight consumed in a particular tank. The associated scale means can be of conventional design and can be of relatively simple construction, yet providing an effective reading. By taking an initial reading when the tank is first disposed on the scale, then any subsequent readings will indicate only ink consumption as the other weights on the scale do not change.

In accordance with the invention there is also provided a means for measuring volume flow in the ink coupling line. This is provided primarily in connection with now determining, not only total ink consumption, but also ink consumption on the basis of each individual ink consuming point which in the illustrated example, is an ink fountain associated with the printing press unit. In this regard, there is thus provided a means for controlling delivery to only one fountain at a time. This means is described herein as being provided in alternate embodiments. In one embodiment, the means for controlling delivery to the fountain is on the basis of time slot allocation. In an alternate embodiment to the invention, it is accomplished on the basis of demand priority queue. By now, limiting flow at any particular time to only one fountain, the electronics can thus detect the volume flow only during this single fountain delivery. Means are provided for cumulatively counting the volume measurements associated with a particular fountain to thus determine total ink consumption allocated to that fountain.

In accordance with the invention, the means for measuring volume may comprise a pump stroke position sensor that measures pump strokes or fractions thereof. This is used in association with means for determining the sensor incremental weight delivery per stroke. Means are provided for totaling the number of pump strokes to provide a volume reading, and furthermore means are provided for establishing an estimated pump constant in pounds per stroke to provide a density reading. These two readings are multiplied in order to determine the weight consumed at a fountain. Because of changes in pump calibration, ink density, and other factors, the total ink consumption as measured by pump strokes (volume) probably differs from the total weight loss from the ink tank as measured by the scale. When the system is operated long enough, so that the uncertainty of weight measurement is a small fractional percentage of the total ink weight pump, then a reconciliation is performed by determining the difference between pump stroke summation weight estimate and weight lost from the tank. The difference is distributed proportionately among the ink consumption estimates. Thus while the system accuracy may be relatively low over short periods of operation, it becomes more and more accurate as operation continues. Such reconciliations may occur at different points in the system measurement.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
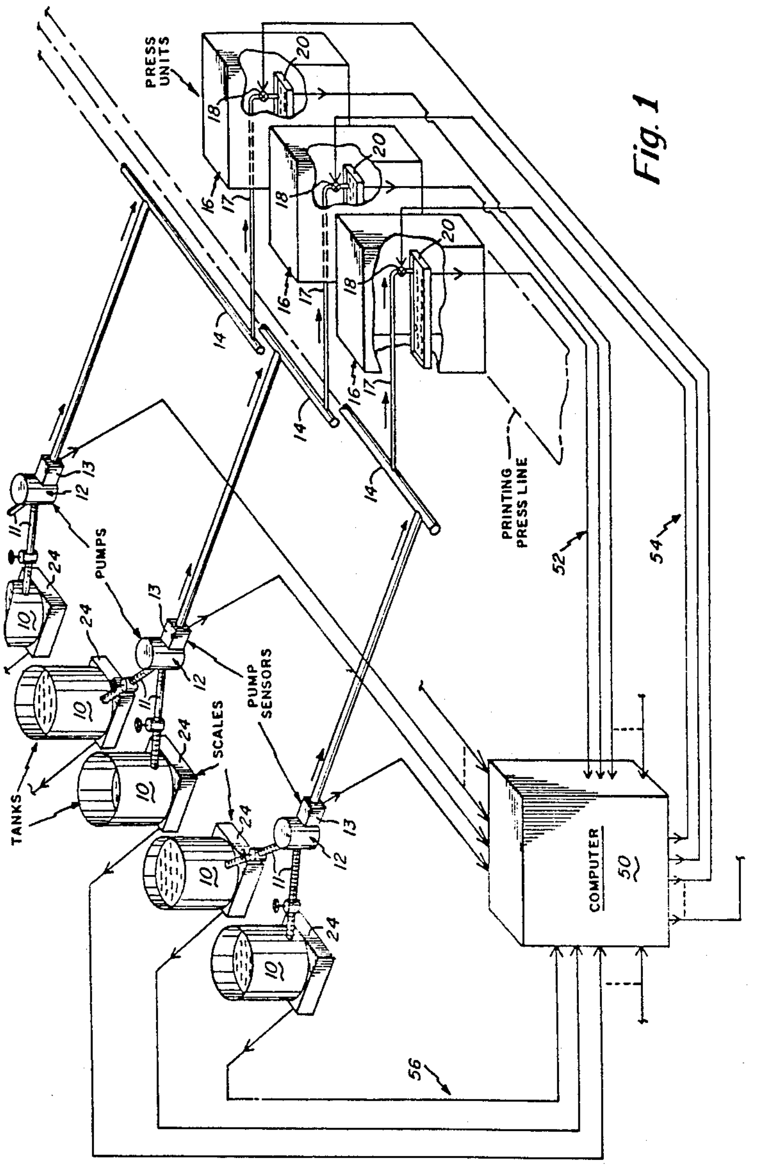
FIG. 1 is a block diagram of a preferred embodiment of the ink monitor system of the present invention.

Reference is now made to the drawings and in particular FIG. 1 which is a schematic diagram of the ink monitor system of the invention. Reference may also be made to the associated schematic diagram of FIG. 2 which illustrates the use of eight separate ink tanks for servicing two presses identified in FIG. 2 as press A and press B, each of which may comprise eight press units.

Figure 2:
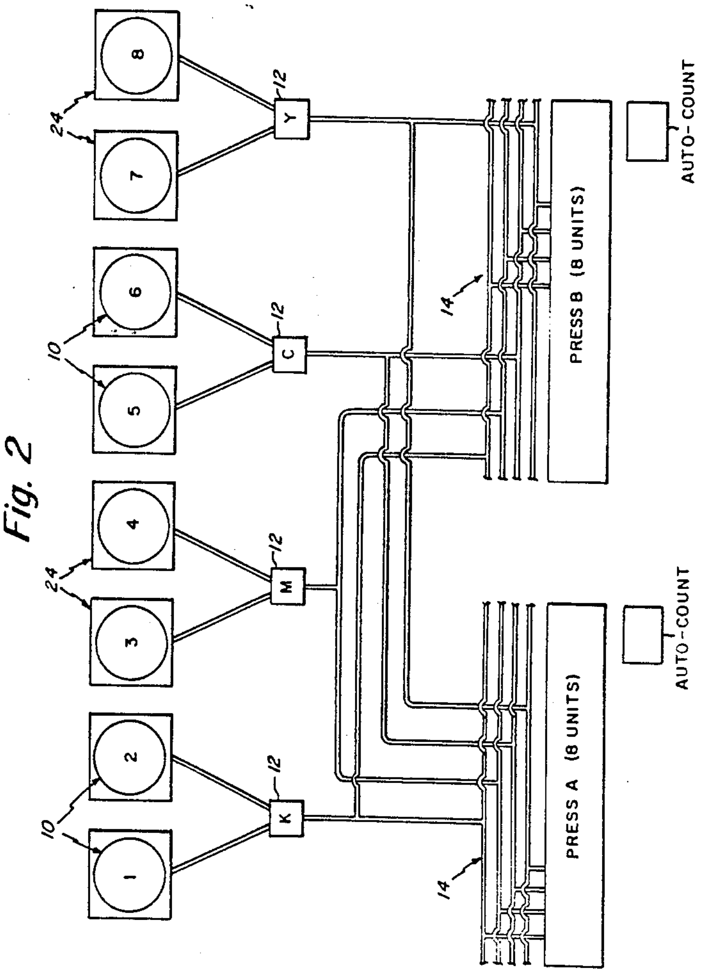
FIG. 2 is a schematic diagram of the ink monitor system shown in association with two presses each comprised of eight units.

In the ink monitor system, ink is supplied to the press from large tanks 10, one for each color in use. In the schematic diagram of FIG. 2 it is noted that there are eight separate tanks. The ink is moved from the tanks to the press by the use of ink pumps which are normally pneumatically operated and that pump ink on demand. FIGS. 1 and 2 show these pneumatically operated pumps 12. The pumps 12 maintain the ink under pressure for delivery to the delivery lines of the press. In this regard, note in FIGS. 1 and 2 the ink delivery lines 14. In FIG. 1 note the press units 16 to which are coupled the ink delivery or feed lines 14.

Whenever a delivery point is opened so that ink can flow, the pressure causes ink to flow and the ink pump 12 strokes so as to feed ink into the lines 14 to the consuming point for long as the delivery point is open. In this regard, note in FIG. 1 the ink delivery valve 18 in the feed line 17. The ink valve 18 controls ink delivery to each of the respective fountains 20.

FIG. 1 also shows associated with each pump 12, a pump sensor 13 which senses the volume flow of ink delivered. Connected from each pump 12 and between the pump and tank are associated hoses 11. Individual valves may be provided in each of the hoses 11.

The ink pump 12 may be mounted on the floor adjacent to the ink tank 10, being connected to the ink tank by the suction hoses 11. In an alternate embodiment, the ink pump 12 may be physically mounted to the top of the ink tank with the pump inlet immersed in the tank interior. Ink from the ink pump is delivered by a flexible line to the ink distribution piping or lines 14 supplying the fountains 20 of one color on one or more presses. An air hose not described in the drawings, supplies pressure to the top of each tank for the purpose of causing a follower plate (not shown) to move down the tank as ink is consumed to prevent formation of voids and to prevent ingestion of air into the ink system.

To attain the object of measuring the weight of ink delivered, the ink tank is placed on a scale 24 that continuously monitors the total weight of tank, ink, and any part of the pump and delivery system that is mounted on the tank. As ink is consumed from an initially full tank, the weight on the scale decreases. The total decrease in weight is the total ink consumption to a very high degree of accuracy. Thus, to determine the total ink consumed from any tank during the course of a job, a shift, a day, or any other period of time, it is necessary only to take the difference between the starting and ending tank weights.

When a tank of ink empties, the valves at the output of the tank are shut off. The empty tank is removed and a full tank placed on the scale and connected with the pump. The ink consumption measuring system requires no operator intervention at a tank change, because the system detects the events connected with the tank exchange as follows.

When the tank is to be changed, the first event is the disturbances of the weight resulting from operators uncoupling the ink supply and air hoses. The system requires that a succession of scale readings be equal within a narrow preset tolerance range before a reading is accepted for purposes of computation of ink consumption. The disturbances associated with disconnecting one tank and reconnecting another prevent the system from accepting as valid any indications of ink consumption and any readings during the period of such disturbances.

Furthermore, when the ink tank is removed usually by a fork truck, the weight of the scale decreases rapidly to a value near zero. When this indication has fallen below a preselected value intermediate the weight of an empty ink tank and an empty scale, the system recognizes that an ink tank has been removed. When a new ink tank has been placed on the scale, and a number of successive weight readings within the established tolerance range have been obtained, then the system registers the full total weight. The act of coupling air and ink hoses disturbs the scale reading again, and during the period of disturbance, no further weight indications are recorded by the system. However, when the attachment process is complete, again, a succession of substantially equal readings is obtained, and the system records the weight of the full tank as modified by the attached air and ink hoses.

Figure 5:
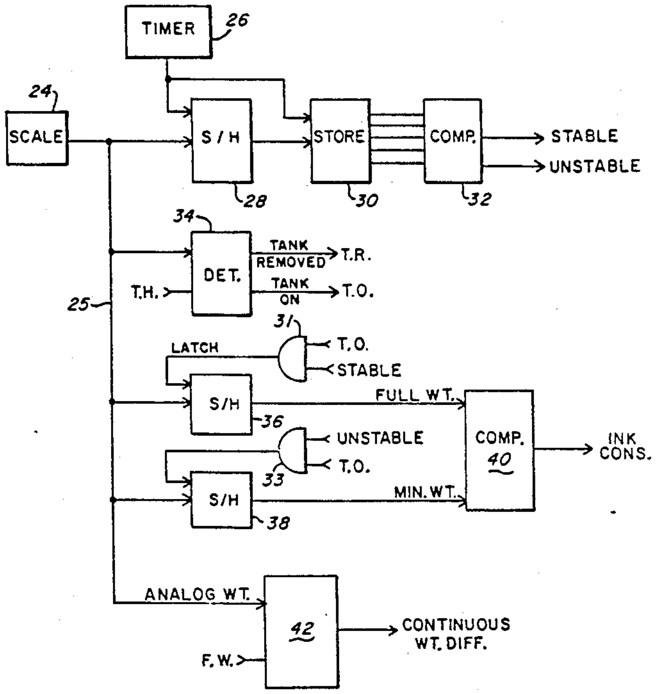
FIG. 5 is a schematic block diagram illustrating control in accordance with the electronics of the invention.

In connection with the foregoing discussion, reference is now made to FIG. 5 which is a block diagram illustrating the manner in which automatic weight registration of ink consumption occurs. FIG. 5 shows the scale 24 which may be considered as having an analog signal output with the level of the signal corresponding to the weight that is being sensed. FIG. 5 also shows in the block diagram, a timer 26, a sample and hold circuit 28, store 30, and comparator 32. There is also included a threshold detector 34 along with two further sample and hold circuits 36 and 38. There is also provided a comparator 40 and a second comparator 42.

It is noted that the analog output from the scale 24 is coupled to a number of circuits for providing some of the detection features previously set forth. The idea is to have an output reading only of ink consumption not effected by other weight changes that occur by virtue primarily of removal and replacement of the tank. For this purpose, the system detects first, a full weight indication when the tank is first placed on the scale and then at the time that the tank is removed, or just before it is removed, a minimum weight reading is taken with the difference in these two weights indicating ink consumption associated with that particular tank.

As indicated previously, when the tank is on the scale and is undisturbed, there will be a series of readings that can be taken that will fall within a narrow preset tolerance range. This assumes that the tank is not being disturbed. The circuitry for detecting this includes the sample and hold circuit 28, timer 26, store 30, and comparator 32. The sample and hold circuit 28 looks at the readings from the scale 24 and the holding of the signal occurs by virtue of the output of the timer 26. The timer 26 operates at some predetermined rate so that successive readings can be taken, stored and held, and then subsequently stored in the store 30. The store 30 may be a register that stores the successive weight readings in either analog or digital form. The series of readings are illustrated as multiple outputs at the output of the store coupled to the comparator 32. The comparator 32 examines each of these successive readings and then determines whether the tank is being disturbed or not. This is indicated at the output of the comparator 32 by the signals STABLE or UNSTABLE.

The STABLE signal in FIG. 5 indicates that the readings are all within a preset tolerance range. If any of the readings fall outside of this range, then the signal is unstable.

FIG. 5 also shows the threshold detector 34 which couples from the signal line 25 and also has a threshold input identified as input TH. The detector 34 basically has two outputs, one indicating a tank removed and the other indicating a tank on the scale. These are indicated as outputs TR and TO, respectively.

The line 25 also couples to the sample and hold circuit 36. The hold or latch input to the circuit 36 is from the AND gate 31 which receives the tank on signal and also the stable signal. Thus, when the full tank is replaced on the scale, the signal TO is generated and after all of the couplings and lines have been connected, the signal STABLE occurs. This causes a latching of the weight signal indicated as a full weight signal at the output of the circuit 36. This signal couples to the comparator 40 at one input thereof.

Also, there is a coupling of the signal on line 25 to the other sample and hold circuit 38. This circuit is latched by virtue of a signal from the AND gate 33. This receives two signals, one which is the signal TO and the other the signal UNSTABLE. This circuit is meant to indicate that when the tank is still on the scale, but there is an indication of instability, then the sample and hold circuit 38 is latched to indicate a minimum weight. It is noted also that the analog weight on line 25 is continuously monitored by the comparator 42 which may also receive the full weight signal. Thus, the output of the comparator 42 provides a continuous weight differential indicating continuous readings of ink consumption. In this regard, it is noted that in another arrangement, the output of the gate 33 may also be used to set a circuit that would then look at the just previous analog weight to determine minimum weight.

The assignment of ink consumption to the individual fountains occurs as follows. The basic ink distribution system operates on demand. Ink flows at any fountain level controller when it is called for and the ink pump operates as required to supply the various ink consuming points. If several of the multiple ink consuming points are drawing ink at any given moment, it is not possible to tell how much ink is actually being consumed at any one point. Because the actual rate of ink consumption at any fountain is only a small fraction of the delivery rate of the pumping system, however, it is possible to limit delivery to one fountain at a time.

Enabling one fountain at a time may be accomplished by either of two methods: by time slot allocation or by demand priority queue. In time slot allocation, each fountain is enabled for a certain period, say 30 seconds, in sequence. If its level controller is calling for ink at that time, the fountain will be replenished. If it is not, the time slot will pass with no ink flow occurring. This system has the virtue of great simplicity and requires no information from the fountains to the ink weighing system in order to function. It has the drawback that it does not make efficient use of the capacity of the ink supply system to deliver ink in that several fountains may be demanding ink at a point when the system has enabled another fountain that does not require any ink during that time slot.

Figure 4:
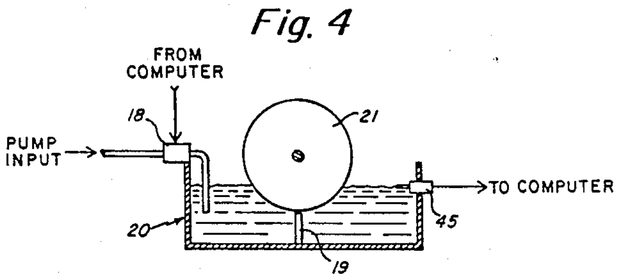
FIG. 4 is a schematic cross-sectional diagram illustrating the fountain arrangement and associated components.
Figure 6:
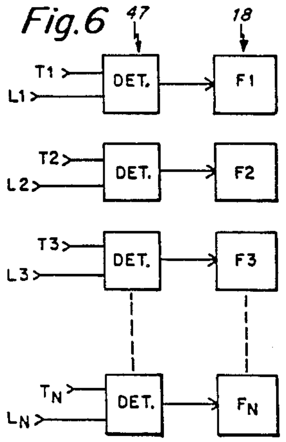
FIG. 6 is a further block diagram illustrating a time slot allocation technique for fountain enabling.

With regard to the delivery of ink to the fountain, reference may now be made to FIGS. 4 and 6. FIG. 4 shows the fountain 20 with associated roller 21 and aforementioned blade 19. FIG. 4 also shows the level sensor 45 and the control valve 18. The level sensor 45 may be of conventional design and simply provides a demand signal to the computer 50 requesting pumping of ink to the associated fountain. Now, on a time slot allocation basis, reference may be made to FIG. 6 which shows signals T1, T2, T3, down to TN. These signals may each be of the aforementioned 30 second duration and may be separated from each other. FIG. 6 also shows a series of detectors 47 each receiving the timing signals and also a level sensor signal identified in FIG. 6 as the signals L1, L2, L3, and LN. This indicates that during time slot Tl, if the level sensor L1 is making a demand because the fountain has to be filled, then the detector 47 associated therewith gives an output that essentially operates the valve 18 at the fountain. FIG. 6 shows these valves F1, F2, F3, and FN. Thus, if during a particular time slot the level controller is calling for ink at that time, the fountain is replenished.

Figure 7:
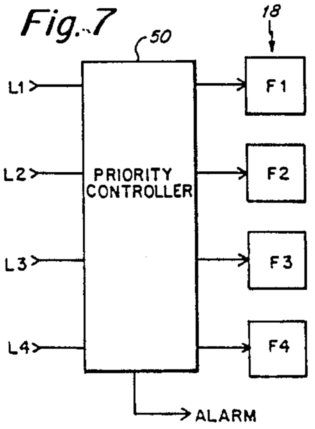
FIGS. 7 and 8 are block diagrams illustrating a demand priority system for fountain enabling.

As mentioned previously, the time slot allocation technique has the drawback of inefficiency. The demand priority system overcomes this problem. To effect it, a signal is brought from each fountain to the ink weighing system to indicate to the ink weighing system when each fountain is demanding ink. In this regard, refer to FIG. 7 which shows the input request signals from the level sensors identified as signals L1–L4. These couple to a priority controller 50 with the outputs thereof being coupled to the individual control valves associated with each fountain identified by the reference characters F1–F4.

Reference is also made to FIG. 1 which shows the level sensor signals from the ink fountains as lines 52 coupling from each of the sensors to the computer 50. FIG. 1 also shows the signals from the computer 50 coupling by way of lines 54 to the respective valves 18. Finally, FIG. 1 shows the connection of the scale weights at lines 56 coupling from each of the scales 24 to the computer 50. Much of the control associated with the computer 50 has previously been discussed in connection with the operation in FIGS. 4–7.

Figure 8:
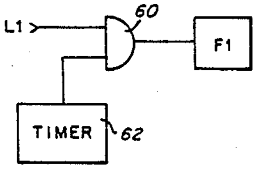

In accordance with the demand priority system, the ink weighing system places the requests from each fountain in a queue and enable each fountain in return to receive ink until the fountain level controller of that fountain is satisfied and the ink flow is shut off then at the fountain. This works well in all normal conditions. However, a failure of a fountain controller that causes it to call for ink continuously, a line breakage that would cause the ink to be discharged in some place other than the fountain, or a line blockage that prevents ink delivery, cause the system to hang up at that fountain and prevent further servicing of other fountains. To avoid this condition, a limit is placed on the length of delivery to any fountain. In this regard, refer to FIG. 8 which shows the level control coupling to some type of a gate 60 having a timer 62 associated therewith which represents the limit on time that pumping can occur to a fountain. When a fountain is enabled to receive ink and the fountain controller continues to call for delivery of ink for more than the preset time of timer 62, then service to that fountain is discontinued and the next fountain in the queue is enabled. The unsatisfied fountain is put back at the end of the queue. If the condition of remaining unsatisfied persists for a preset number of enablings, then a fault alarm is given to indicate that some form of fountain malfunction has occurred. In this regard, note the alarm output in FIG. 7.

To ensure that the system is in a state of static equilibrium at the start and end of each measurement, a period of time is allowed to elapse from the shut-off of one fountain as indicated by the switching of the fountain demand signal to the OFF state and the enabling of the next fountain in the queue. During the period in which no ink is delivered, the ink pump is stationary and the pressure in the entire ink system from the pump to the respective fountain level controller solenoid valves is equal to the stall pressure of the pump. However, when a fountain valve is open, allowing ink to flow, the pump may stoke quite rapidly, delivering a reduced pressure at that time and the pressure in the downstream part of the system may be further reduced as a consequence of pressure drops in the lines. These changes in pressure in the system result in changes in the volume of the ink stored in the system as a result of the compressibility of ink and lines and also as a result of the compression of any air bubbles in the system. By ensuring that the system is always at the same state at the time of measurement, errors which might arise from these pressure changes in the system are avoided. The system also requires that a series of successive scale readings fall within the established tolerance band to ensure an accurate weight reading, before enabling the next fountain.

By use of a pump stroke position sensor on each ink pump, the volume of ink delivered in a given period can be compared with the weight of ink delivered as measured by the scales. To give an incremental weight delivery for each stroke or fractional stroke of the ink pump, this pump calibration is carried out over a relatively large number of pump strokes, such as 1,000. The delivery to any one fountain will generally be a small number, in the range of ten to twenty strokes. However, the incremental weight delivered to the fountain may be precisely determined by counting the number of strokes and fractional strokes.

Thus, one can arrive at an indication of weight per pump stroke. This in combination with the enabling of one fountain at a time makes it possible to thus quite accurately obtain an indication of weight of ink pumped, not only from an individual tank, but to each individual fountain.

The use of the pumps and the fountain levelers are very convenient for many applications. In one extreme the pumps or the levelers would not be easy to interface. For this configuration, one can use very simple flow meters in the individual ink lines to determine when and how much volume is used by that line. This has the further virtue that many lines can use ink simultaneously from a common tank. The ink consumption is determined in either case as described below.

The total ink consumption at any fountain is determined in several steps. As the ink supply system delivers ink to the fountains, the ink monitoring system totalizes the number of pump strokes and fractional strokes (that is: the volume used) during which ink is delivered to each fountain. These totals, multiplied by the last estimated pump constant in pounds per stroke (that is: density) give the estimated total ink weight consumption for each ink consuming point.

$$\text{Estimated Weight} = \begin{matrix}\text{Volume}\\ \text{(used since}\\ \text{last weight}\\ \text{measurement)}\end{matrix} \times \begin{matrix}\text{Density}\\ \text{(weight loss}\\ \text{divided by}\\ \text{volume used)}\end{matrix}$$

Because of changes in pump calibration, ink density, and other factors, the total ink consumption as measured by pump strokes (volume) differs from the total weight loss from the ink tank as measured by the scale. When the system is operated long enough, so that the uncertainty of weight measurement is a small fractional percentage of the total ink weight pumped, then a reconciliation is performed by determining the difference between pump stroke summation weight estimate and weight lost from the tank, and the difference is distributed proportionately among the ink consumption estimates.

$$\text{Actual Density} = \frac{\text{Actual Weight Lost}}{\text{Total Volume used}}$$

-continued $$\text{Reconciled correct weight} = \text{Actual Density} \times \begin{matrix}\text{Volume for each}\\ \text{fountain.}\end{matrix}$$

Thus, while the system accuracy may be relatively low over short periods of operation, it becomes more and more accurate as operation continues. Such reconciliations are typically performed after just enough weight lost to ensure accuracy (typically 100 lbs.), or at transition points in the production operation, such as change of ink tank, change of the job being run on the press, or end of day or week. This is necessary in order that the production records prepared in those transitions be as accurate as possible.

Figure 3:
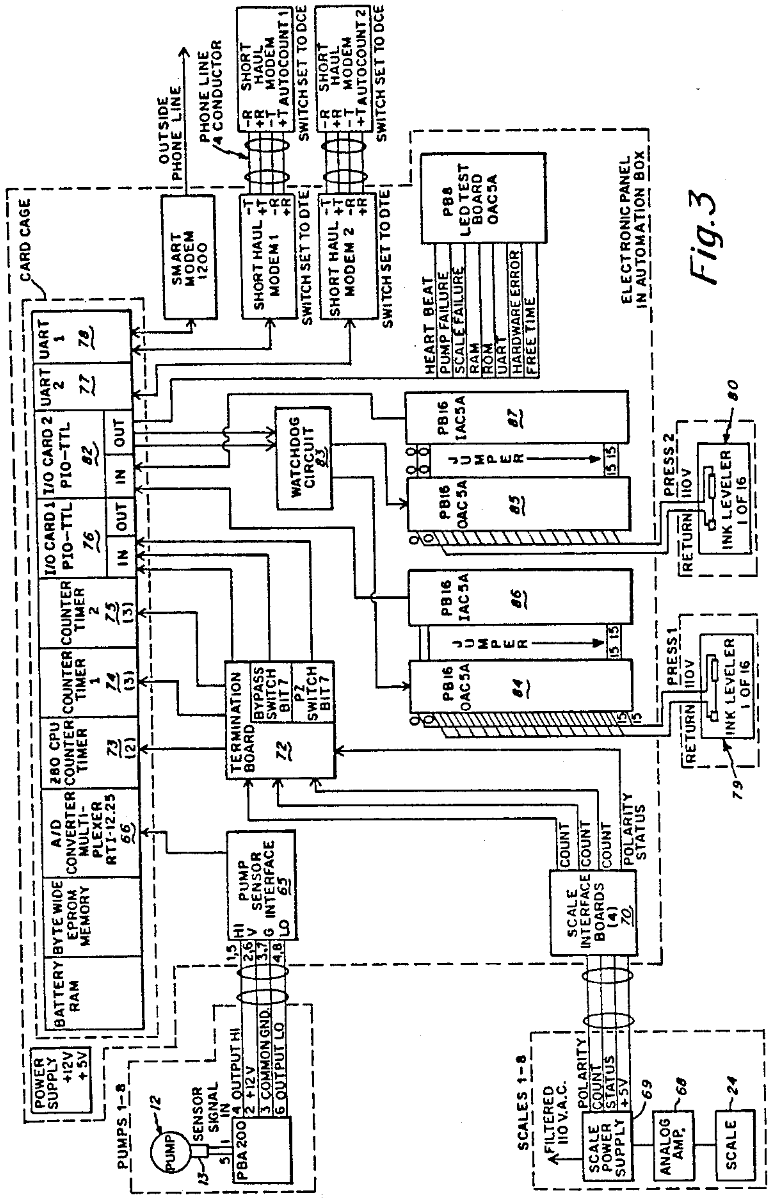
FIG. 3 is an electronic block diagram of the ink monitor system.

Reference is now made to FIG. 3 which shows a block diagram of the electronics of the ink monitor system of the present invention. In FIG. 3 there is illustrated the pump 12 and associated sensor 13. The pump and sensor couple to a pump sensor interface 65 and the output from the interface 65 couples to an analog-to-digital converter and multiplexer 66. The sensor output also illustrated in FIG. 1 coupling to the computer 50 is now more specifically defined in FIG. 3 as coupling to an analog-to-digital converter and multiplexer 66. The circuit 66 keeps track of the volume flow through the sensor 13 in terms of pump strokes.

FIG. 3 also illustrates a scale 24, the output of which couples by way of an analog amplifier 68 to the scale power supply 69. The output of the power supply couples to a scale interface board 70 and the output from circuit 70 couples to a termination board 72. It is noted that the circuit 72 couples to a Z80 CPU counter timer 73, and also timer circuit 74 and 75. Furthermore, there are outputs from the circuit 72 coupled to the input of the I/O circuit 76. Reference is also now made to the aforementioned FIG. 5 and the block diagram set forth therein. Much of the circuitry shown in FIG. 3 relates to the block diagram of FIG. 5. The outputs from the scale are detected in terms of readings that are taken and interpreted in accordance with the previous teachings of FIG. 5. The circuitry described in FIG. 3 provides the aforementioned registration of successive weight outputs for comparison purposes to identify stability or instability at the scale. Inputs to the I/O circuit 76 indicate data being stored in computer memory for the purpose of comparisons.

FIG. 3 also illustrates certain modem connections to the circuitry. These connect at the UART 77 and 78. These modem units permit communication externally with the system.

In FIG. 3 reference is also made to the electronic interface relative to the ink levelers identified in FIG. 3 as ink levelers 79 and 80. These ink levelers provide the combined function of detection of liquid level (see also the sensor 45 in FIG. 4) as well as the capability of a liquid feed as controlled and illustrated previously in connection with the valve 18 shown in FIG. 4. In this connection it is noted that there is also provided in the circuitry, a second I/O circuit 82 having outputs that couple to a watchdog circuit 83. The circuit 83 may be of conventional design and simply receives periodic signals requesting a watch on the ink levelers. It is noted that the output of the watchdog circuit 83 couples to circuits 84 and 85. Circuits 84 and 85 may be data latch or register that is interrogated from the watchdog circuit to determine if any ink leveler is requesting ink flow. It is noted that the circuits 84 and 85 couple, respectively, to related circuits 86 and 87. These circuits may also be a form of latch or register and the outputs thereof couple to the input of the I/O circuit 82. Thus, as liquid level sensors detect a need for liquid flow, the signal is coupled by the respective storage registers to the computer via the circuit 82 to indicate the need for solenoid control. The solenoid control may also be carried out through an output from the I/O circuitry coupling to operate the respective solenoid valves. In this regard, note the control lines 54 coupled from the computer 50 in FIG. 1.

Figure 9:
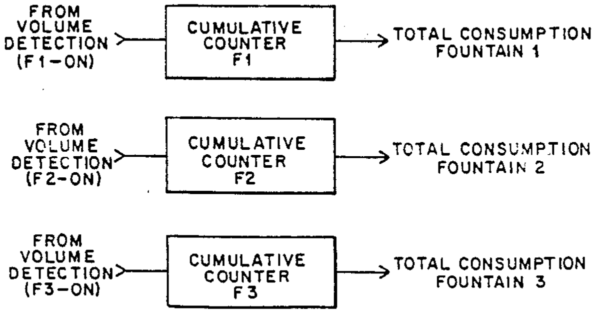
FIG. 9 is a block diagram showing cumulative counters that are employed in providing total consumptions on a per fountain basis.

As explained previously, one of the features of the system of the present invention is the advantage of being able to measure, not only total ink consumption from a storage tank, but also ink consumption to the individual consuming points or fountains. Again, in accordance with the invention, this is carried out by virtue of the aforementioned technique of enabling only one fountain at a time. There have been described previously, two different methods for carrying this out, one by time slot allocation and the other by demand priority queue. Now, in this regard, reference may be made to FIG. 9 which shows a series of cumulative counters. Each of these counters is enabled on a selective basis so that they count volume by virtue of pump strokes, but only during the time that the associated fountain is being filled. Therefore, the cumulative counter Fl in FIG. 9 is adapted to provide a count relating to volume detection, but only in the instance in which its associated fountain is receiving the ink. Thus, the output from this cumulative counter provides a total consumption associated with fountain number 1. FIG. 9 also shows by illustration, two other cumulative counters with their associated outputs. Thus, it can be seen from FIG. 9 that what is finally generated, is a series of cumulative counts each providing an indication of total ink weight consumption associated with that fountain.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. Ink fountain system comprising;
at least one ink source tank,
a plurality of ink storage fountains,
at least one pump means disposed external of the ink storage fountains and connected to said at least one source tank,
a plurality of coupling lines for the ink connecting from said at least one ink source tank to said at least one pump means to the respective ink storage fountains,
the ink in said coupling lines being commonly pressurized by said pump means,
a plurality of valve means one in each of said coupling lines,
control means for selectively operating each said valve means to couple ink under pressure into its associated ink storage fountain,
a level sensor associated with each said ink storage fountain,
and means responsive to said level sensor for controlling said control means and in turn said valve means to maintain the level of ink in the ink storage fountain within a desired level range,
said control means including means for operating only one valve means at a time to control delivery of ink to only one fountain out of said plurality of fountains at a given pump stroke time period,
wherein for said given pump stroke time period, the amount of ink remaining in said source tank is directly indicative of the amount of ink that has been used by said fountains, and
said means for operating only one valve means at a time including time control means to enable each valve means to be activated sequentially upon a desired time basis.

2. Ink fountain apparatus as set forth in claim 1 wherein said control means includes time slot allocation means.

3. Ink fountain apparatus as set forth in claim 1 wherein said control means includes demand priority queue means.

4. Ink fountain apparatus as set forth in claim 1 including means for setting a time limit on length of delivery to a fountain.

* * * * *